United States Patent [19]

Hill

[11] Patent Number: 5,847,530
[45] Date of Patent: Dec. 8, 1998

[54] SYSTEMS AND METHODS FOR TORQUE CONTROL OF ACTUATOR AND BRUSHLESS DC MOTOR THEREIN

[75] Inventor: Michael L. Hill, Rockton, Ill.

[73] Assignee: Barber Colman, Loves Park, Ill.

[21] Appl. No.: 920,052

[22] Filed: Aug. 28, 1997

[51] Int. Cl.[6] .................................................. G05B 11/28
[52] U.S. Cl. ..................... 318/599; 318/254; 318/138; 318/439; 388/804
[58] Field of Search .................... 318/257, 138, 318/439, 599; 388/804

[56] References Cited

U.S. PATENT DOCUMENTS

| | | | |
|---|---|---|---|
| Re. 35,124 | 12/1995 | Erdman et al. | 318/599 |
| 3,463,984 | 8/1969 | Ross et al. | 318/127 |
| 3,582,739 | 6/1971 | Daab et al. | 318/275 |
| 3,700,990 | 10/1972 | Shuey et al. | 318/375 |
| 3,716,770 | 2/1973 | Habisohn et al. | 318/259 |
| 3,755,727 | 8/1973 | Schifalacqua | 318/696 |
| 3,761,790 | 9/1973 | Daab | 318/467 |
| 3,836,833 | 9/1974 | Harris et al. | 318/270 |
| 3,906,315 | 9/1975 | Gotisar | 318/212 |
| 3,914,671 | 10/1975 | Morton | 318/139 |
| 3,974,427 | 8/1976 | Carson | 236/1 C |
| 4,136,304 | 1/1979 | Baechler et al. | 318/372 |
| 4,429,262 | 1/1984 | Utenick | 318/254 |
| 4,476,418 | 10/1984 | Werner | 318/332 |
| 4,491,775 | 1/1985 | Harvey et al. | 318/434 |
| 4,534,706 | 8/1985 | Palm et al. | 417/17 |
| 4,546,296 | 10/1985 | Washbourn et al. | 318/372 |
| 4,546,298 | 10/1985 | Wickham et al. | 318/372 |
| 4,642,537 | 2/1987 | Young | 318/254 |
| 4,695,779 | 9/1987 | Yates | 318/484 |
| 4,703,241 | 10/1987 | Denshi et al. | 318/599 |
| 4,756,391 | 7/1988 | Agarwal | 188/106 P |
| 4,907,493 | 3/1990 | Bellanger et al. | 91/361 |
| 4,933,620 | 6/1990 | MacMinn | 318/696 |
| 4,969,756 | 11/1990 | Villec et al. | 388/815 |
| 4,973,894 | 11/1990 | Johansson | 318/280 |
| 5,023,527 | 6/1991 | Erdman et al. | 318/254 |
| 5,070,283 | 12/1991 | Avitan | 318/139 |
| 5,089,761 | 2/1992 | Nakazawa | 318/811 |
| 5,191,270 | 3/1993 | McCormack | 318/254 |
| 5,193,647 | 3/1993 | O'Brien, II | 185/40 R |
| 5,254,915 | 10/1993 | Komatsu et al. | 318/369 |
| 5,291,106 | 3/1994 | Murty et al. | 318/375 |
| 5,319,291 | 6/1994 | Ramirez | 318/254 |
| 5,329,217 | 7/1994 | Kerkman et al. | 318/811 |
| 5,339,013 | 8/1994 | Nakai et al. | 318/254 |
| 5,349,279 | 9/1994 | Avitan | 318/803 |
| 5,424,622 | 6/1995 | Keller | 318/375 |
| 5,444,349 | 8/1995 | Rozman et al. | 318/716 |
| 5,543,694 | 8/1996 | Tice | 318/379 |
| 5,550,451 | 8/1996 | Itoh et al. | 318/811 |
| 5,625,269 | 4/1997 | Ikeda | 318/696 |

OTHER PUBLICATIONS

Linear Interface ICs Device Data, Motorola Inc., 1993 pp. 1,57, 63–67, 70–74.

Unitrode, Date Book, Switchmode Driver for 3–0 Brushless DC Motors, Jun. 1993, pp. 103, 105.

Unitrode, Date Book Brushless DC Motor Controller, 5/93, pp. 39–43.

Phillips Semiconductors Application Note, L. Engh. C. Fenger, L. Hadley, D. Linebarger, NE5570: A theory of operation and applications, 8/88, pp. 1–6.

*Primary Examiner*—Karen Masih
*Attorney, Agent, or Firm*—David Barron; Jules Jay Morris; Terrence Martin

[57] ABSTRACT

A brushless DC motor is controlled by determining a speed of the motor and a line voltage supplying drivers of the motor. Based upon these determined values and predetermined motor performance data, a maximum PWM on-time is determined for drive signals supplied to windings of the motor. This maximum PWM on-time thereby limits motor torque output to a predetermined maximum. Stopping the motor is performed in sequential phases including a loaded generator phase, an active braking phase and a holding phase. During holding, the amount of energy supplied to the motor is reduced to the point just before slippage such that holding energy is minimized. Upon power failure, the motor is driven toward a spring return home position overcoming static friction that may prevent the spring return mechanism from functioning properly. These techniques are applied to a motor in an actuator.

24 Claims, 11 Drawing Sheets

5,847,530

SYSTEMS AND METHODS FOR TORQUE CONTROL OF ACTUATOR AND BRUSHLESS DC MOTOR THEREIN

CROSS REFERENCE TO RELATED APPLICATIONS

This Patent application is related to copending U.S. Patent Applications, "Systems and Methods for Braking of Actuator and Brushless DC Motor Therein," Atty. Dkt. No. 97,308, Ser. No. 05/920,053, filed on Aug. 28, 1997, and "Systems and Methods for Actuator Power Failure Response," Atty. Dkt. No. 97,309, Ser. No. 08/920,051, filed on Aug. 28, 1997.

TECHNICAL FIELD

The present invention relates, in general, to motor control technology. More specifically, the present invention relates to methods and systems for controlling brushless DC motors.

BACKGROUND OF THE INVENTION

Brushless DC motors represent an attractive motor technology for many applications such as, for example, actuators. Advantageously, they have high operating efficiencies and high power densities. However, controlling these brushless DC motors is relatively complex, requiring dedicated controllers and multiple high-power semiconductor drivers.

One aspect of brushless DC motor control is regulating output torque. This is conventionally performed using motor current sensing. To summarize this technique, one or more current sensing resistors are placed in series with one or more of the motor windings. The voltage drop across the current sensing resistor(s) is measured, and indicates motor torque. Unfortunately, the use of current sensing resistors adds expense in terms of parts count, space required, cooling requirements, and energy efficiency.

A further complication of using brushless DC motors relates to starting and stopping them, particularly when under load. One previously used motor stopping technique involved maintaining high power on a particular winding combination to 'lock' the motor in position. However, this consumes large amounts of power, generates excess heat, and is often ineffective if slippage occurs.

The above-described problems are multiplied when a brushless DC motor is included in another device such as, for example, an actuator. Static and dynamic loads resulting from the actuator application are imparted on the motor further complicating control thereof.

The present invention is directed toward solutions to the above-identified problems.

SUMMARY OF THE INVENTION

Briefly described, in a first aspect, the present invention includes a method for use in controlling a brushless DC motor. The motor is energized by multiple drivers, wherein the drivers supply energy to the motor based upon a motor winding commutation pattern and a PWM control signal used therewith. The speed of the motor is thereby controlled.

In particular, the method includes determining the speed of the motor and a line voltage supplying the drivers of the motor. Then, based upon the speed, the line voltage and predetermined motor performance data, a maximum PWM on-time for the PWM control signal is determined. The maximum PWM on-time corresponds to a predetermined motor torque output. The motor performance data may include constant torque curves for combinations of line voltage, motor speed and PWM on-time.

As an enhancement, the motor may include at least one positional sensor used in determining the time between positional changes. The positional information may be accumulated to facilitate determining absolute motor position in the form of at least a number of motor rotations.

As a further enhancement, the motor may be included within an actuator and coupled to an output member thereof through reduction gearing. In this configuration, the method may include tracking a position of the output member of the actuator using the determined absolute motor position. The method may also include controlling rotation of the motor to selectively position the output member of the actuator. During the positioning of the actuator, the speed of the motor is regulated using the PWM control signal. More particularly, the PWM control signal may be limited to the maximum PWM on-time to limit motor torque output to the predetermined motor torque output.

In another aspect, the present invention includes a method of operating an actuator that includes an output and a brushless DC motor mechanically coupled thereto. The brushless DC motor is controlled at least in part by a PWM control signal operable to control an amount of energy transferred to the motor.

More particularly, the method comprises positioning the actuator by operating the motor. During the positioning, output torque of the motor is controlled (the controlling includes collecting operational motor data that is exclusive of motor current consumption). This data is used in combination with predetermined motor performance data to regulate motor torque using the PWM control signal.

In a further aspect, the present invention includes a method for stopping rotation of a brushless DC motor. The method includes operating the motor as a loaded generator. During this loaded generator operation, a motion profile of the motor is monitored.

To continue, when the motion profile of the motor reaches a predetermined characteristic, an active deceleration mode is engaged. This mode operates by driving the motor in a direction opposite to its rotation. When a reversal of motor rotation occurs, a holding mode is engaged to hold the motor position static.

As an enhancement to the above, the motor may include multiple windings, and operating the motor as a loaded generator may include grounding at least one of the windings. Also, monitoring the motion profile of the motor may include monitoring at least one of a speed, a deceleration profile, and a number of rotations of the motor.

As a further enhancement, wherein the motor includes multiple windings, the active deceleration mode may includes monitoring a rotational position of the motor and a direction of rotation of the motor. In response to the monitored position and direction, a pattern of windings is engaged that is rotationally behind a current motor position. This provides energy to decelerate the motor. This pattern may be updated as the motor continues to rotate. Further, the holding mode includes the engagement of a pattern on the windings to hold the motor steady.

In yet another aspect, the present invention includes a method for holding a brushless DC motor steady while minimizing an amount of energy engaged on the windings. The method includes setting an on-time of the PWM control signal to a first predetermined value. A motor winding commutation pattern is applied to the motor to hold the motor in its current position. The on-time of the PWM control signal is then decreased and a check for motor slippage is performed. If motor slippage occurs, the on-time of the PWM control signal is increased until the slippage stops.

As an enhancement, the first predetermined value may comprise a PWM on-time previously used to stop rotation of the motor. Further, when the slippage occurs, the motor commutation pattern is updated to correspond to a current, slipped, motor position.

As a further enhancement, the motor may be included in an actuator where it mechanically drives an output member thereof. The method thereby includes holding the output member of the actuator in a designated position. Also, the method may include executing a positional control feedback loop to selectively operate the motor to place the output member of the actuator in a selected position, and hold it in the selected position. The positional control feedback loop may include hysteresis about its positional set-point. Thus, repositioning of the motor is not performed unless the slippage of the motor exceeds a predetermined amount.

In an additional aspect, the present invention comprises a method of operating an actuator that includes an output member and a brushless DC motor mechanically coupled thereto. The output member has a spring return mechanism coupled to it that provides bias toward a home position. The method includes detecting a power failure of power supplied to the actuator. Upon power failure, the brushless DC motor is driven to move the output member of the actuator toward the home position. This overcomes static friction that may prevent the spring return mechanism from working. Further, a check may be performed to insure that the actuator is not already in home position before beginning motion thereto.

The actuator may include a power supply, and as an enhancement, driving the brushless DC motor may use residual energy stored in the power supply. Further detecting the power failure may include monitoring a power supply voltage within the actuator and sensing a power failure when the power supply voltage falls below a predetermined level. The monitored power supply may comprise a power supply voltage for drivers of the brushless DC motor.

In further aspects, the present invention includes apparatus corresponding to the above-described methods.

The present invention has several advantages and features associated with it. Torque control of a brushless DC motor is performed without the use of current sensing techniques. This facilitates the elimination of, for example, sensing resistors that consume energy, occupy space and dissipate heat. Also, actuator stopping and holding is performed in a manner that minimizes the amount of energy required. Further, problems associated with motor cogging and other static friction interfering with the spring return mechanism are mitigated. Thus, the techniques disclosed herein advance the art of actuator and motor control.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

Figure 1:
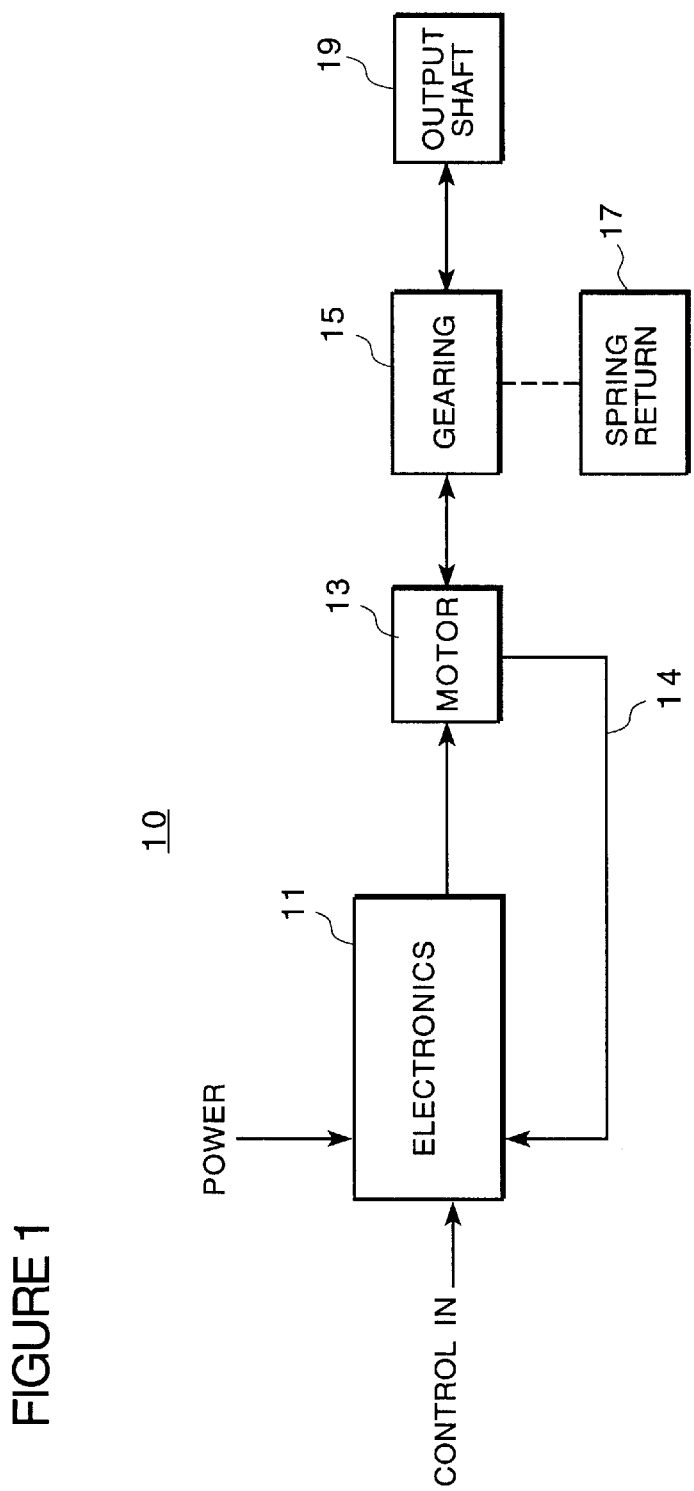
FIG. 1 is a block diagram of an actuator pursuant to an embodiment of the present invention.

Beginning with FIG. 1, a block diagram of an actuator 10 is depicted. In general, actuator 10 may be used to position a wide variety of mechanisms attached thereto. In one example, the actuator may be attached to a ventilation louver assembly. In another example, the actuator may be attached to a valve. More particularly, and by way of example, the actuator described herein has a rotational output member (e.g., a shaft). However, this output member may be mechanically translated to provide other output members such as, for example, a linear output member.

Turning to the embodiment of FIG. 1, actuator 10 includes control electronics 11 which receive power and control inputs. Control electronics 11 are coupled to a motor 13 to both energize the motor and to receive a positional feedback signal 14 therefrom. Motor 13 is mechanically coupled to an output shaft 19 vis-à-vis gearing 15. The gearing 15 has a spring return mechanism 17 coupled to it such that upon motor deenergization, output shaft 19 will be biased toward a home position.

In the current embodiment, gearing 15 is reduction gearing with a large (e.g., 14,000:1) reduction ratio. This facilitates an application requiring relatively high output torque at a relatively low speed. However, this gearing can be modified depending on the particular actuator application requirements. Moreover, spring return 17 may be eliminated if a mechanical home return mechanism is not desired.

Figure 2:
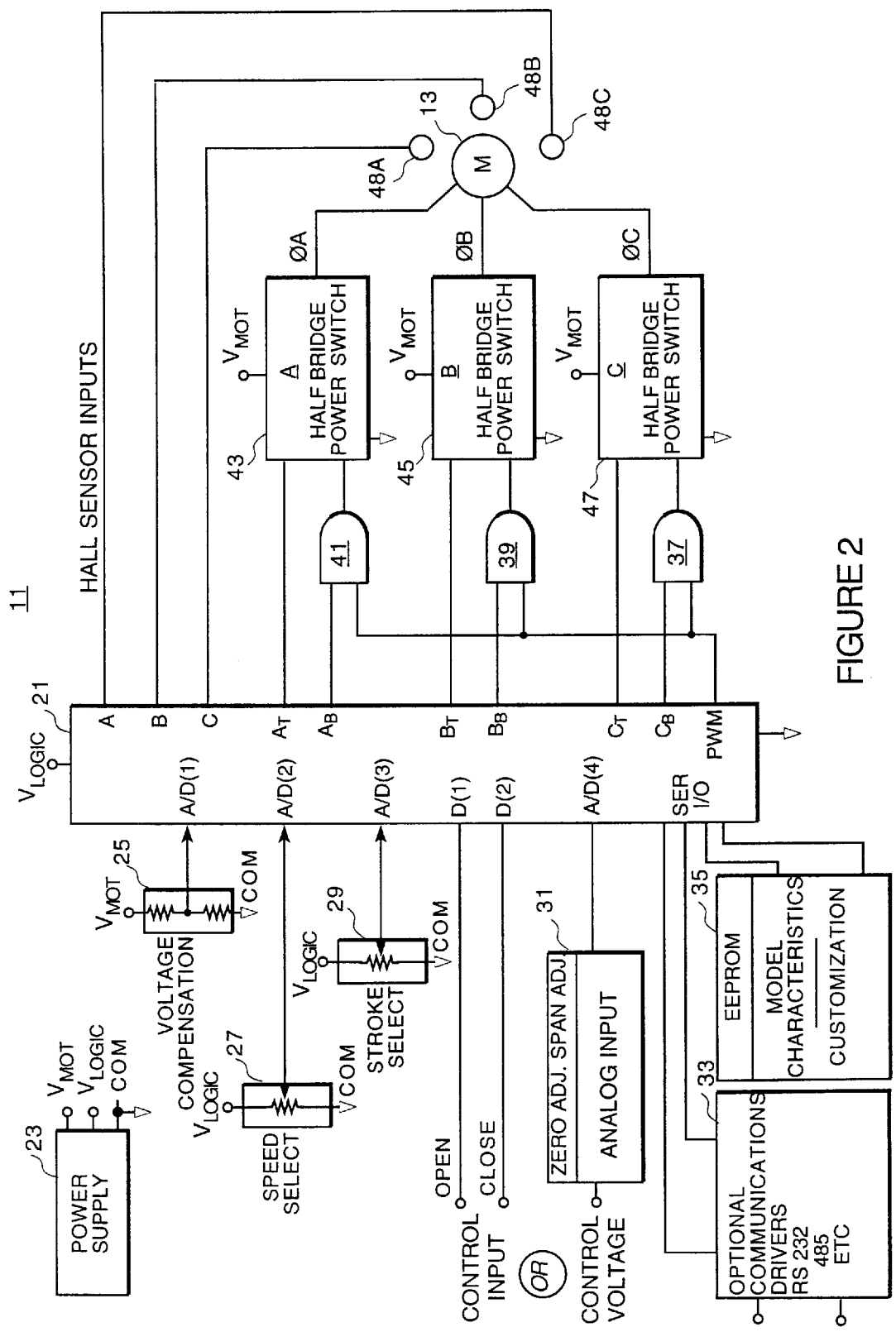
FIG. 2 is a block diagram of the electronics of the actuator of FIG. 1 in accordance with one embodiment of the present invention.

Turning to FIG. 2, the electronics 11 and motor 13 aspects of actuator 10 are more particularly depicted. A processor 21 provides control of actuator 10. Processor 21 is selected based upon application requirements (e.g., memory, power consumption, computing power, I/O, etc.) and in one embodiment, a Philips Semiconductors brand, model 83C749 CMOS single-chip 8-bit microcontroller is used.

Processor 21 is coupled to motor 13 through three half-bridge power switches 43, 45 and 47. Each switch is a driver for a different winding (i.e., phase) of motor 13 which is a brushless DC motor. Embodiments with other than three windings would have a corresponding number of drivers. The top half of each switch is driven from processor 21 outputs $A_T$, $B_T$ and $C_T$. The bottom half of each switch is driven by signals from processor 21 outputs $A_B$, $B_B$, and $C_B$ as ANDed with a PWM output of processor 21 by gates 41, 39 and 37 (either discrete gates, or implemented in programmable logic or software). The PWM control signal is used to control the amount of energy transferred to motor 13 and will be explained in further detail hereinbelow.

The assembly of motor 13 includes position sensors 48A, 48B and 48C which in the current embodiment are hall-effect sensors. These sensors provide a feedback signal to processor 21 such that processor 21 may determine the current rotational position of motor 13 (within the limits of the sensor configuration). As is well known in regard to brushless DC motors, this positional information may be generally used to, for example, determine winding engagement patterns for controlling motor rotation. Other positional sensors may be used in other embodiments and include, for example, optical sensors and back-EMF sensing techniques.

Power for actuator 10 is provided by a power supply 23 that has an output, $V_{MOT}$, for powering the motor drivers (43, 45 & 47) and an output, $V_{LOGIC}$, for powering electronics including the digital logic within actuator 10.

Processor 21 has several analog inputs used according to the present invention. To note, in the current embodiment, the analog inputs are integral with the processor 21 and are multiplexed through a common A/D converter; however, other A/D topologies can be used according to the techniques described herein.

A first analog input, A/D(1) reads the voltage at a node within a voltage divider 25 connected between the motor supply, $V_{MOT}$, and a common. This input is used to determine $V_{MOT}$ for use with the motor control techniques described hereinbelow. A second analog input A/D(2) is connected to a "speed select" potentiometer 27 that a user adjusts to control actuator speed. A third analog input A/D(3) is connected to a "stroke select" potentiometer 29 that a user adjusts to control actuator stroke (e.g., degrees of rotation or length of travel). In the current embodiment, potentiometers are used for the above-described user input; however, other forms of user input are possible such as, e.g., through a computer interface, or though a user I/O keypad/display facility. Also, if adjustment is unnecessary in a particular embodiment, the adjustments could be eliminated in favor of preprogrammed settings.

A fourth analog input A/D(4) receives a control signal for proportional control of actuator position. Conditioning electronics 31 provide adjustment of the control signal voltage/current to be compatible with the A/D(4) input of processor 21. As one example, if the control input has a range of 0–10 V, electronics 31 may reduce the input voltage by one-half to result in a 0–5 V range. Further, electronics 31 provide zero and span adjustment for the control signal. Zero and span adjustment could be performed digitally in an alternate embodiment.

Two digital inputs, D(1) and D(2), are connected to processor 21 and provide actuator control signals alternate to the proportional control input described above. An "open" and a "closed" signal are provided to D(1) and D(2), respectively, and will cause the actuator output to appropriately move in one of an open and a closed direction when engaged.

Processor 21 is connected to an external serial interface through communications drivers 33 (e.g., RS-232, 485, etc.). This serial interface has many uses including computer control/feedback of actuator position and configuration parameters, test and diagnostics, calibration and software updating.

Further, a variety of outputs can be added to the circuit of FIG. 2 to provide indications of position. For example, a digital output can indicate a positional set-point being attained. Also, an analog output can be added to provide a voltage or current output related to actuator position within its stroke.

Lastly concerning FIG. 2, a non-volatile memory 35 (e.g., EEPROM) is connected to processor 21 and is used to store configuration information for actuator 10. For example, non-volatile memory 35 may contain motor characterization data for use as described herein. Alternately, if sufficient memory of the appropriate type exists in processor 21 itself, it could be used instead of an external memory device such as, for example, non-volatile memory 35. The particular memory model/configuration used will vary as a function of design and application requirements.

During actuator operation, the PWM on-time of the motor control signal is limited to a dynamically computed maximum value such that maximum actuator torque output is limited. Various factors influence the maximum PWM on-time such as motor driver supply voltage, motor speed and predetermined motor performance data.

Figure 3:
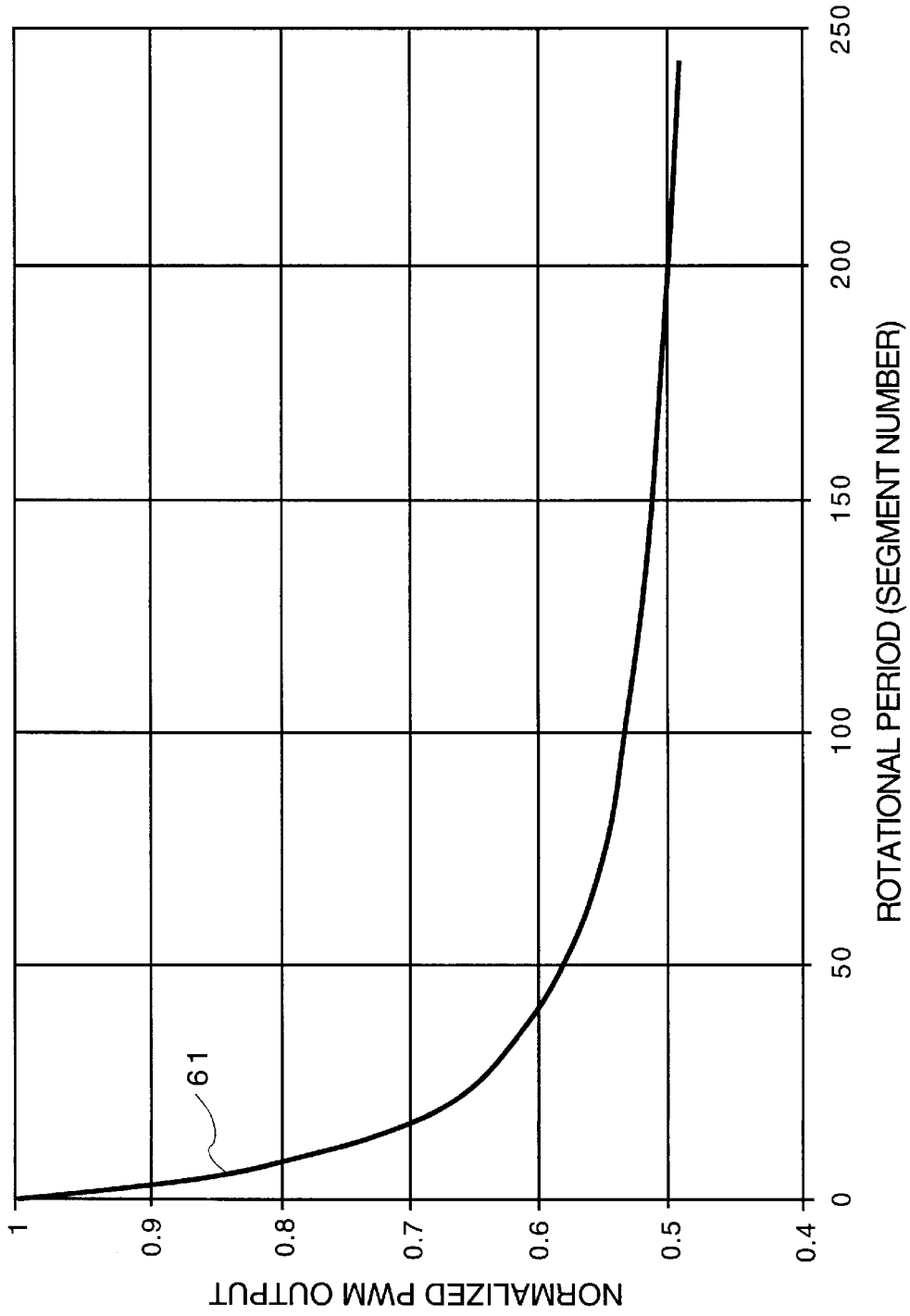
FIGS. 3–4 are example graphs of motor performance data in conformance with an embodiment of the present invention.
Figure 4:
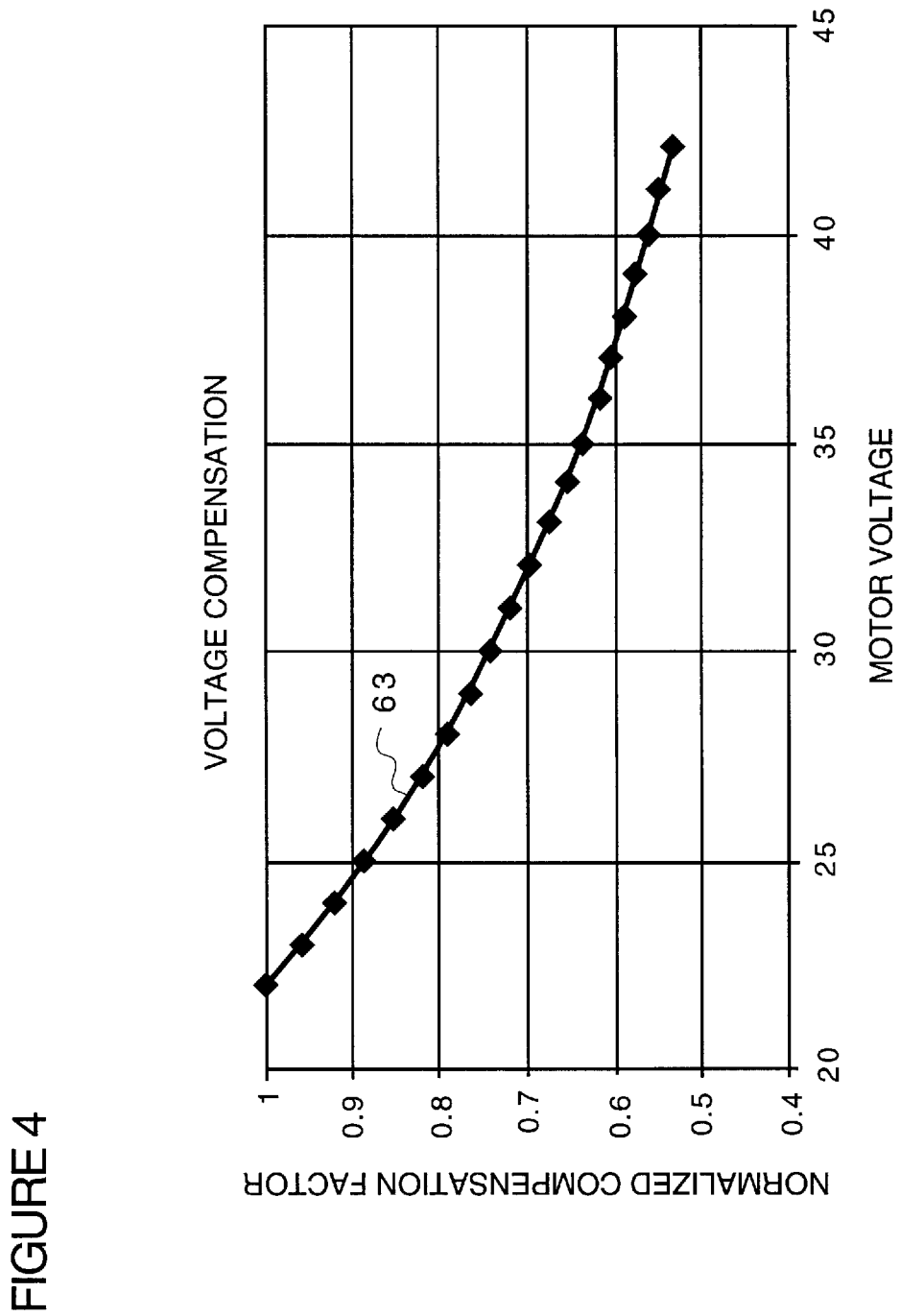

In one embodiment, example graphs of motor performance data organized according to the present invention are depicted in FIGS. 3–4. Regarding FIG. 3, a constant torque curve 61 is determined for motor 13 using a dynamometer. The torque used is the maximum actuator torque. This graph data is shown in connection with a normalized PWM value at the lowest intended motor driver supply voltage (e.g., 22 volts). Each segment shown corresponds to approximately 7.5% of a period of rotation (T) at the design operating speed. Thus a particular segment number n on the graph corresponds to a rotational period of (1+0.075n)T, which is a measure of the speed of the motor.

Turning to FIG. 4, a graph of a normalized compensation factor versus motor voltage is shown (trace 63). In operation, as motor voltage increases, this compensation value is used to reduce the PWM on-time to maintain the predetermined torque limit.

Thus, to summarize, the motor speed and driver voltage are dynamically monitored during motor operation. As they vary, a maximum PWM on-time is appropriately updated, and corresponds to a maximum desired output torque. For example, since the torque of a DC motor increases as speed decreases, the maximum PWM on-time will be decreased as motor speed decreases (thereby limiting torque output). Also, since torque increases with motor voltage, as the driver voltage increases, the maximum PWM on-time is decreased (thereby limiting torque output). The determined maximum PWM on-time is used as a limit on the actual PWM control signal applied to the motor drivers (through logic circuitry described herein).

The above control scheme executes continuously during actuator operation such that the maximum torque limit is rigorously enforced. In one embodiment, this torque limiting technique is implemented in connection with a "watchdog" timer set to expire at about two times the normal time between hall code changes at desired operating speed (e.g., 1ms). A stall is detected when the motor is operating at the predetermined torque limit and motor speed is less than ¼ of desired operating speed (and the motor is not initiating rotation from being stopped).

Many different implementations of the above technique are possible. However, in a preferred embodiment, the maximum PWM on-time (i.e., a PWM limit) is dynamically determined as: Max_pwm_on-time=(Model_Factor) (Speed_Factor)(Voltage_Factor)

Model_Factor is a preset value that defines the desired torque output for the specific actuator model. It is the PWM on-time that corresponds to the desired torque output at the desired operating speed and the lowest operating voltage (e.g., one embodiment is designed for 1500RPM, 22 volt minimum, 1.3 oz.-in. torque).

Speed_Factor is a normalized representation of the PWM on-time required to generate a specific (the desired) output torque at a specific speed (i.e., a specific time between hall changes) at the lowest operating voltage. Speed (period) is the independent variable (measured) and PWM on-time is the calculated value (dependent). Speed_Factor is maximum at the desired operating speed, and decreases and speed is decreased (period increases). Speed_Factor is determined from motor performance data such as, for example, that of FIG. 3.

Voltage_Factor is a normalized representation of the motor's operating voltage. It has a maximum value (1) at the lowest specified operating voltage and decreases as operating voltage increases. Voltage Factor is determined from motor performance data such as, for example, that of FIG. 4.

In the current embodiment, the measurement of motor rotational speed is the time between positional changes of the motor (e.g., time between hall sensor counts). To note, this measure is inverse of, e.g., a RPM-type rotational speed measurement. In the current embodiment, all computations are based upon the time between positional changes for computational efficiency. However, the techniques of the present invention are usable with a variety of motor speed measurements.

Figure 5:
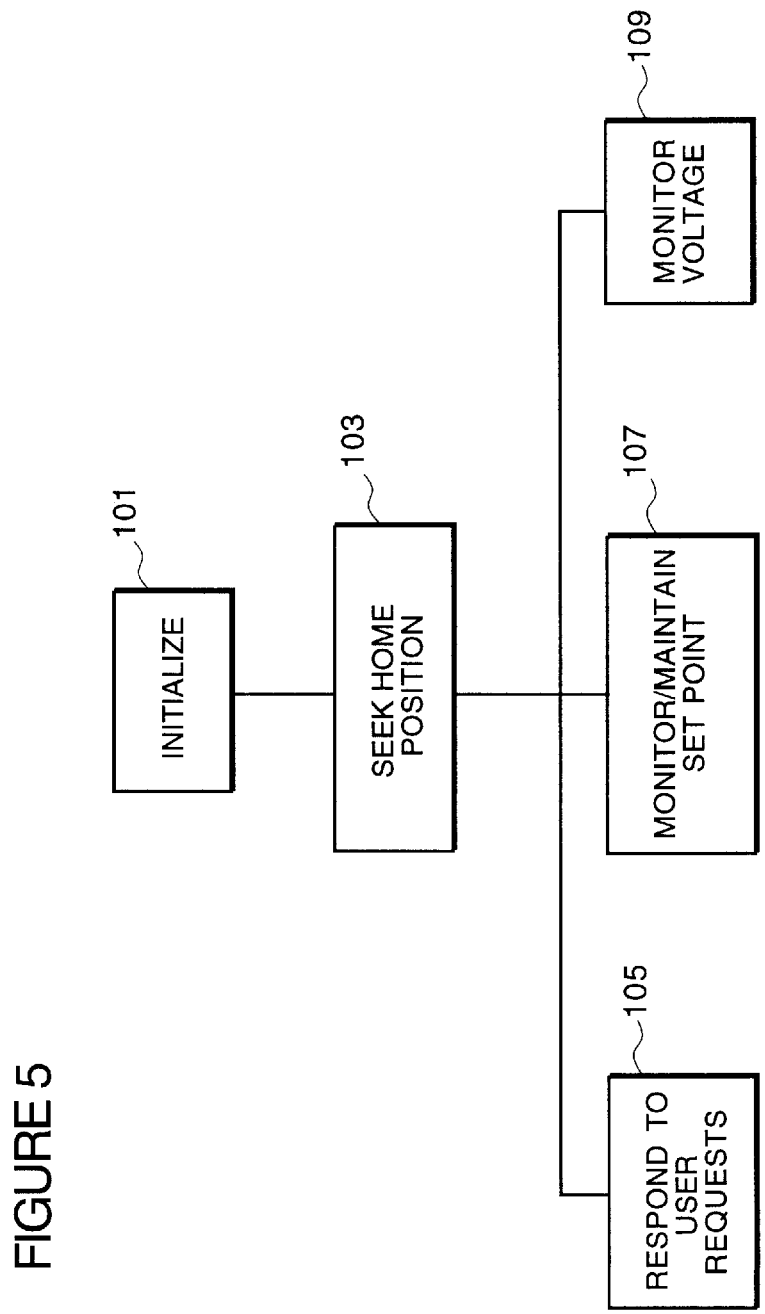
FIG. 5 is a flow-diagram of actuator operation pursuant to one embodiment of the present invention.

Operational sequences are now depicted in accordance with the present invention. Turning first to FIG. 5, a high-level actuator control sequence is depicted. Initialization is first performed (STEP 101) and includes, for example, basic processor booting, memory integrity checks, and software initialization including, for example, variable allocation. Next, the home position of the actuator is determined (STEP 103). This is performed by moving the actuator toward home position until the mechanical stop of the system is detected. The mechanical stop is detected by monitoring the motor speed upon torque limit (see, for example, FIG. 8 hereinbelow). When motor stall limits are reached (i.e., torque limit is reached at less than ¼ desired operating speed), it is assumed that the mechanical limit of the actuator is reached. Accordingly, once this travel limit is detected, by using the known gearing ratios in combination with monitoring motor rotation, the exact actuator position is always known. At additional cost, additional sensors could be added to detect actuator position (e.g., an optical encoder or potentiometer)

As a next step, several tasks are maintained active during actuator operation. Firstly, a task is executed that responds to user requests for actuator operations (STEP 105). Secondly, a task is executed that actively maintains the set point (desired position) for the actuator (STEP 107). Thirdly, the power supply for the actuator is monitored such that appropriate action may be taken upon power failure (STEP 109). These tasks are described in further detail hereinbelow.

Figure 6:
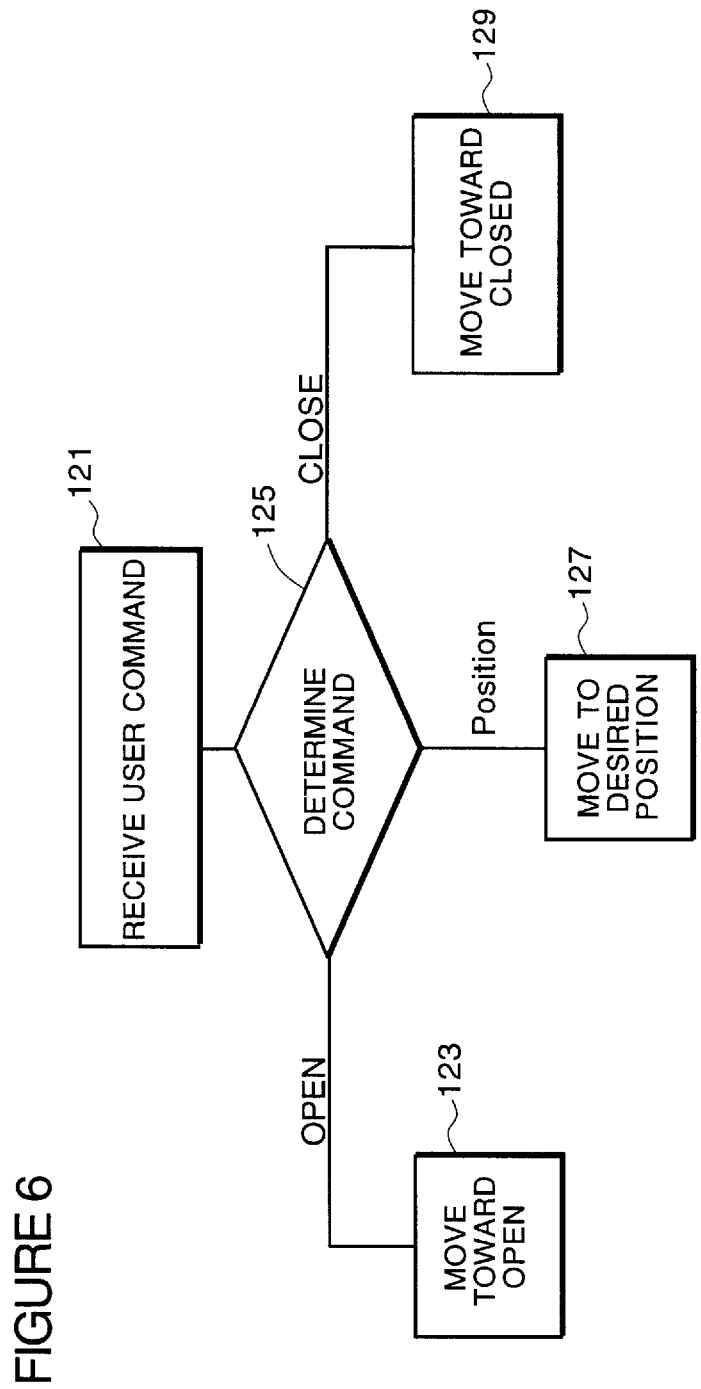
FIG. 6 is a flow-diagram of a technique for actuator response to positional commands in accordance with an embodiment of the present invention.

Depicted in FIG. 6 is a flow-diagram of a technique for actuator response to user requests. To begin, a user command is received (STEP 121). In the current embodiment, this command may arrive through the analog (proportional position signal), digital (OPEN and CLOSE signals), and computer (RS-232/485/422, etc.) interfaces. Depending on the particular actuator command, one of three procedures may be initiated (STEP 125). If an actuator open command is received, a procedure is called to move the actuator toward an open position (STEP 123). If an actuator close command is received, a procedure is called to move the actuator toward its closed position (STEP 129). If a command is received that calls for the actuator to move to a particular position (e.g., through the proportional analog input or through the computer interface), a procedure is called to move the actuator thereto (STEP 127).

In the current embodiment, the procedure used to move the actuator to a position operates using a desired absolute motor position. Absolute motor position is determined from the user specified actuator position in combination with the known gearing ratios between the motor and actuator output. Absolute motor position, as used herein, is defined as the rotational position of the motor, in terms of revolutions, throughout complete actuator travel. Thus, in the current embodiment, wherein the actuator has a maximum output rotation of 180 degrees, and the gearing ratio to the motor is 14,000:1, absolute motor position ranges from 0 to 7,000 rotations (fractional values permitted). Rotational position, as used herein, refers to the rotational position of the motor within the sensing limits of the positional sensors.

Figure 7:
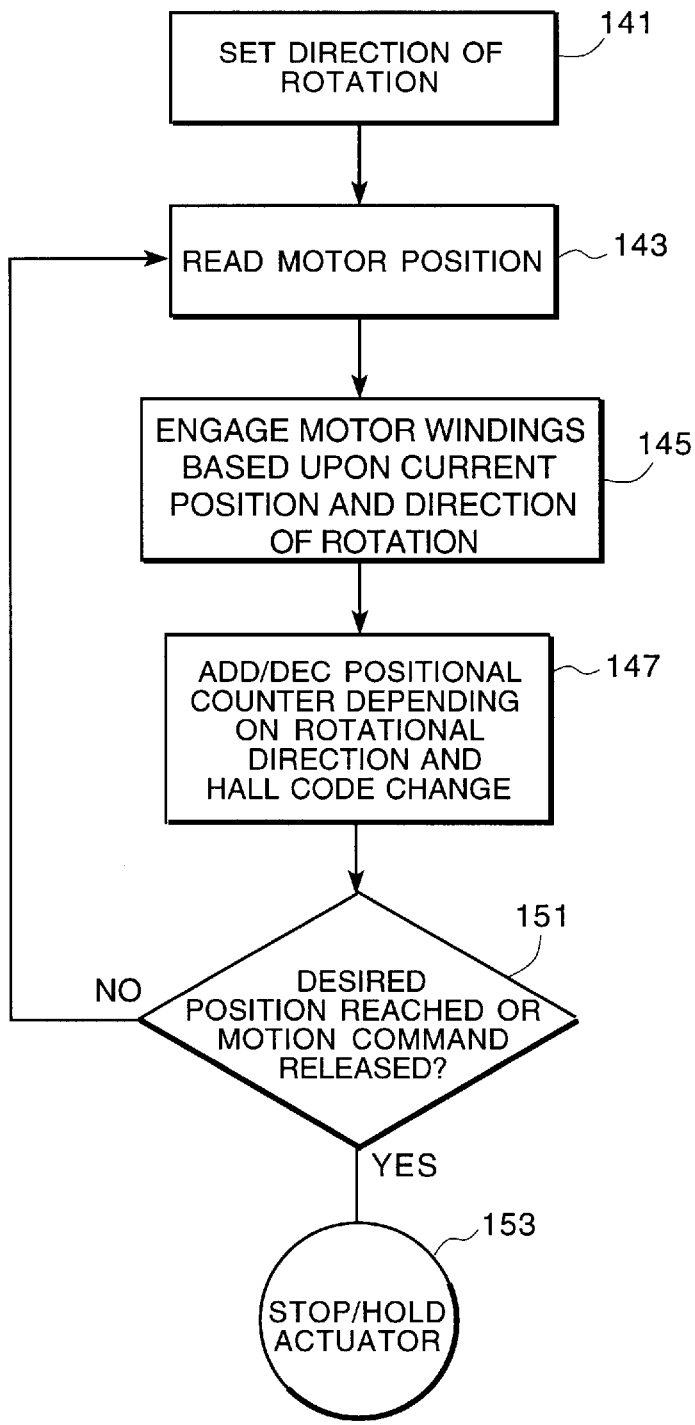
FIG. 7 is a flow-diagram of a technique for commuting a brushless DC motor in response to an actuator position set-point change pursuant to one embodiment of the present invention.

The operation of the procedure used to move the motor to a specific absolute position is depicted in FIG. 7. To begin with reference thereto, a direction of rotation is determined by comparing the desired absolute motor position to the current absolute motor position (STEP 141). Current rotational motor position is next determined from the motor's positional sensors (STEP 143). Then, based upon the current rotational position, and the direction of rotation, an appropriate winding pattern is determined and applied to the motor drivers (STEP 145).

As an example, if clockwise rotation is desired, the motor winding pattern that will elicit clockwise rotation from the motor's current rotational position is engaged upon the motor's windings. In the current embodiment, as one implementation example, the winding pattern update is performed every 555 microseconds at the design operating speed. The winding pattern update is performed fast enough such that it does not primarily govern motor speed, which is primarily regulated by the PWM control signal on-time described hereinbelow in connection with FIG. 8.

To continue, a counter used to track absolute motor position is incremented or decremented (depending on rotational direction) to maintain absolute motor position (STEP 147). In the current embodiment, absolute motor position is maintained in units of hall counts, that is, hall-code changes. Thus, if a hall-code change did not occur between iteration of the main loop of FIG. 7, the INC/DEC of STEP 147 is not performed.

A test is next performed to determined if the desired absolute motor position has been reached (STEP 151). If the desired absolute motor position has not been reached, the loop iterates to STEP 143. If the desired absolute motor position has been reached, a procedure is executed which will stop and hold the motor (STEP 153). The motor will also be stopped if a motion command is released, such as, from the OPEN or CLOSE digital inputs of the actuator. When the command is released, the current positional set point for the actuator is updated to reflect the current position.

During operation of the actuator as described above, a torque limiting procedure is executed to maintain maximum actuator torque below a predetermined limit. This control is performed as part of the motor speed control according to the technique depicted in the flow-diagram of FIG. 8. To recall, desired motor speed is set as a user input parameter using, for example, the potentiometric or computer interface input depicted in FIG. 2.

Figure 8:
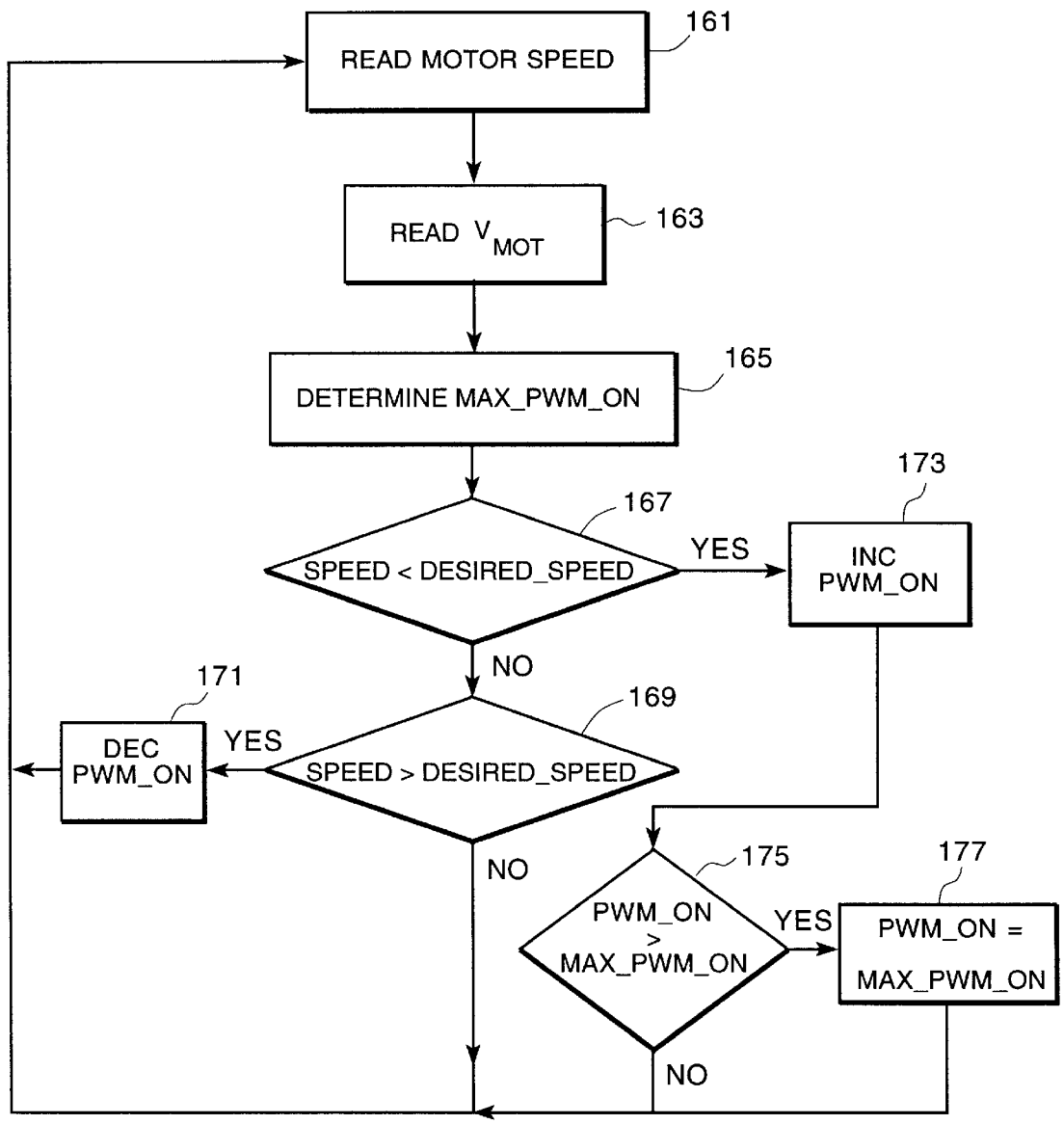
FIG. 8 is a flow-diagram of a torque control technique in accordance with an embodiment of the present invention.

To begin regarding FIG. 8, a motor speed measurement is taken (e.g., determine the time between hall counts—STEP 161). The motor driver voltage is also determined (STEP 163). Using the motor speed measurement and the motor driver voltage, a maximum PWM on-time is determined from the motor performance data of, for example, FIGS. 3–4 (STEP 165). This maximum PWM on-time will set an upper torque limit for the motor in its current operating state.

Continuing, a desired speed for the motor is compared to the actual motor speed (again, in the current embodiment, speed calculations are performed with respect to the time between positional motor changes—STEP 167). If the actual speed is less than the desired speed, the PWM on-time is increased (STEP 173). This will cause more energy to be transferred to the motor windings thereby increasing its speed. The new PWM on-time is compared to the maximum PWM on-time used as a torque limit (STEP 175), and if the PWM on-time exceeds the maximum, it is limited thereto (STEP 177). The technique then iterates with the reading of the motor speed at STEP 161.

If, upon comparison of actual speed to desired speed (STEP 167, 169), the actual speed exceeds the desired speed, then the PWM on-time is decreased (STEP 171). The technique then continues with the reading of the motor speed at STEP 161. Thus, motor speed and torque control have been performed.

Figure 9:
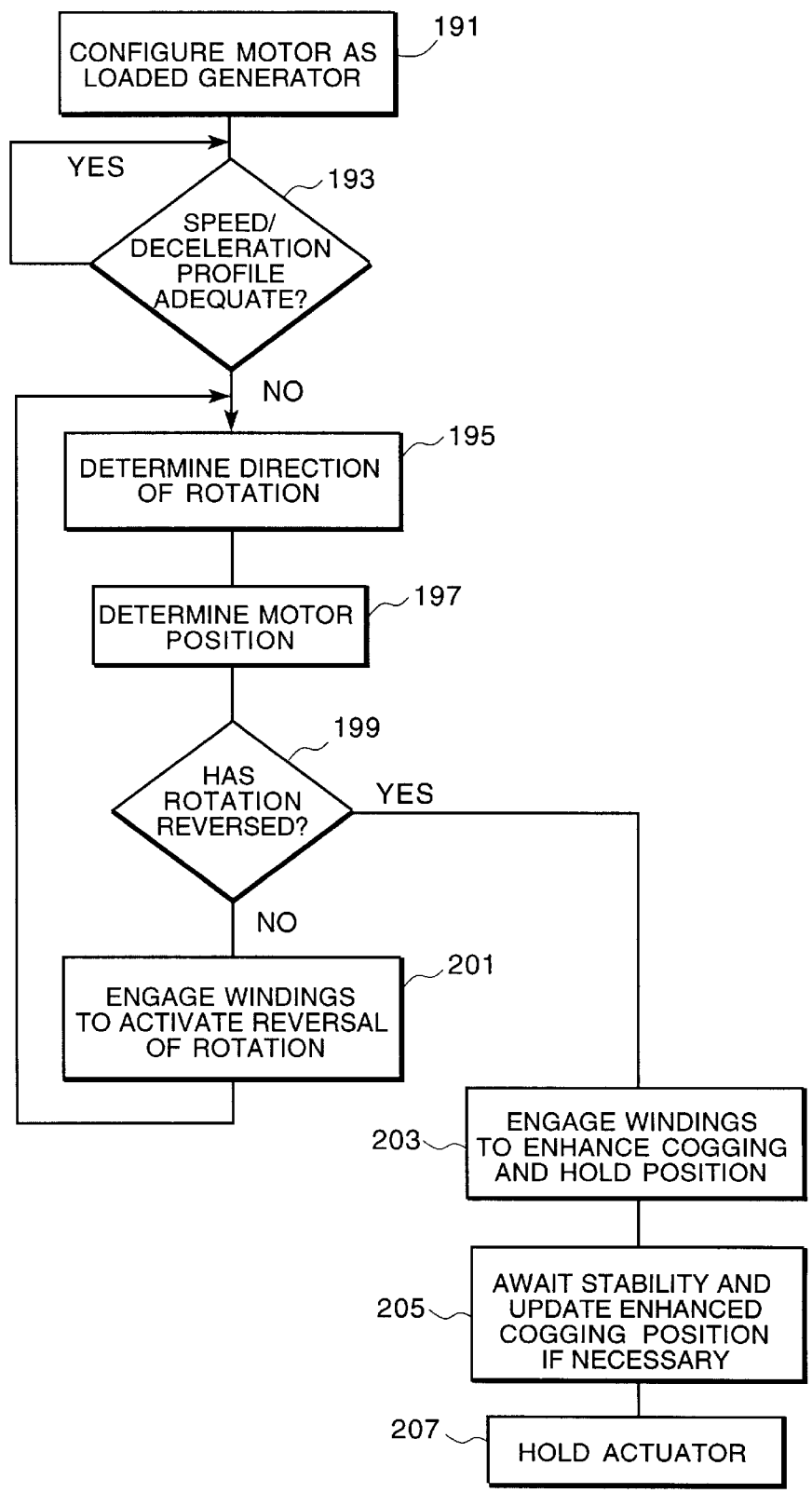
FIG. 9 is a flow-diagram of a technique for stopping actuator/motor motion in conformance with one embodiment of the present invention.

Momentarily turning back to FIG. 7, when the absolute motor position has reached its desired setpoint and stopping/holding of the motor is desired (STEP 153), the techniques depicted in FIG. 9 are instantiated. The below described techniques stop and hold the motor/actuator while advantageously minimizing power requirements therefor.

Stopping the motor/actuator motion begins with operating the motor as a loaded generator (STEP 191). This is performed by grounding each of the motor windings through their corresponding drivers (by engaging the lower halves of the half-bridge drivers).

The loaded generator braking mode is maintained, while monitoring the motor's motion profile (e.g., speed, deceleration, and/or rotations) (STEP 193). This braking mode becomes less effective as the motor slows. Thus, in one embodiment, loaded generator braking is held until motor speed is reduced by ½ or 8 mechanical revolutions occur (whichever occurs first).

The succeeding braking mode is an active deceleration mode including a loop that begins within a determination of rotational direction (STEP 195). Further, the current motor position is determined (STEP 197). A test is next performed to determine if the rotational direction has reversed within the active deceleration loop (STEP 197).

If rotational direction has not reversed, active deceleration is maintained by engaging the motor windings in a pattern designed to achieve reversal of rotational direction (STEP 201). The particular pattern will vary with the motor parameters. In the current embodiment, the determined motor position and direction of rotation are used in determining and engaging (through a look-up table) a winding pattern rotationally "behind" the motor position. This engaged pattern will provide force in a direction opposite of the current motor rotation. Eventually, the motor will slow, stop and then reverse direction. Until reversal of direction has occurred, the loop iterates (to STEP 195).

A reversal of direction indicates that deceleration has completed and the motor should then be held static as described below. As the active deceleration loop has a time resolution of a fraction of a motor rotation, the initial reversal of direction results in very little rotational momentum, and thus, active braking in the again reverse direction is not required.

To reiterate, when rotation has reversed (STEP 197), a holding technique begins. First, given the current motor position, a winding pattern is engaged to enhance the natural cogging of the motor about its current rotational position (STEP 203). Rotational stability is awaited for a short time (e.g., ½ second) and the winding pattern is updated if some rotational slippage occurs (STEP 205). Accordingly, the motor is stopped and held in position. Next, techniques are practiced to maintain the motor's held position, and to minimize the energy required therefor (STEP 207).

During the above-discussed active braking technique, the PWM on-time is ramped up to facilitate braking. The PWM on-time begins at a predetermined minimum and is ramped up during active braking until a limit is reached. The predetermined minimum, limit and amp rate will vary based upon motor, actuator and application requirements; however, in one embodiment, the predetermined minimum is 5% of the Model_Factor, the limit is 25% of Model_Factor and the ramp rate is 1 count per ¼ mechanical revolution. Each count is equal to 1/256 of the PWM on time range (0–255) and is thus equal to a change of approximately 0.4%.

Figure 10:
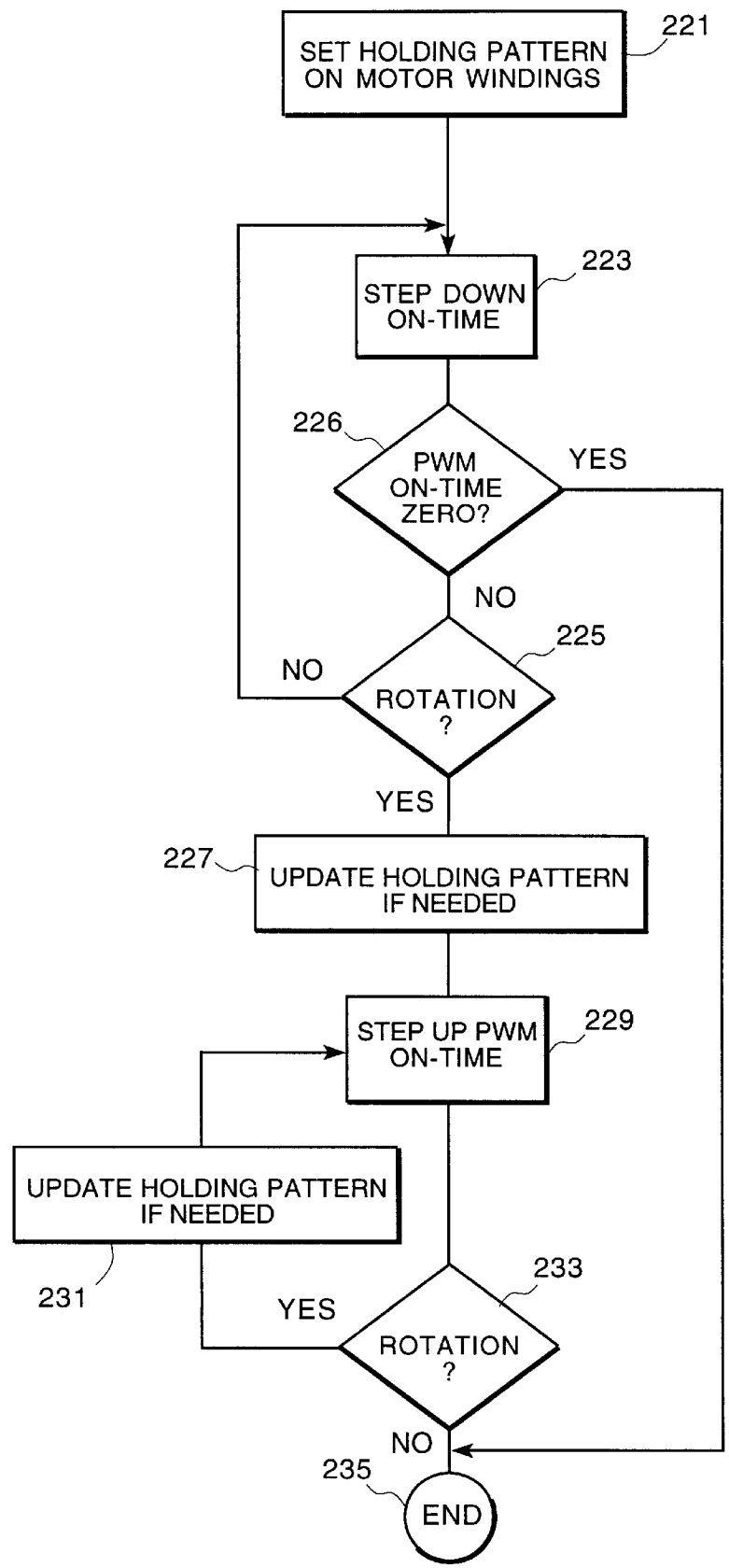
FIG. 10 is a flow-diagram of a technique for holding a brushless DC motor/actuator in a static position in conformity with one embodiment of the present invention.

Turning to FIG. 10, the motor/actuator holding technique begins with maintaining the currently engaged holding pattern on the motor's windings (STEP 221). However, according to the techniques disclosed herein, the energy applied to the motor to hold it in place is now reduced until a minimum of holding energy is achieved. Accordingly, a loop in entered wherein the PWM on-time used for the holding winding pattern is gradually stepped down (STEP 223) (e.g., at a rate of 1 count per ¼ second) until either slippage (STEP 225), or zero PWM on-time is achieved (STEP 226).

If slippage occurs, the holding pattern on the motor windings is updated if required to hold the motor in its current (slipped) position (STEP 227). A loop is then entered wherein the PWM on-time of the motor windings is stepped-up (STEP 229) until rotation ceases (STEP 233). During this loop, the winding pattern is updated as required to the hold rotation in the current motor position (STEP 231). Once rotation has ceased, the current winding pattern and PWM on-time are maintained and the holding routine ends (STEP 235). In one embodiment, if slippage occurs and the PWM on-time is at its upper limit for active braking, the active braking loop is reentered.

Turning back to FIG. 5, during operation of the actuator, the positional set point thereof (i.e., corresponding to absolute motor position) is monitored for change (STEP 107). Should deviation from the set point exceed a predetermined amount, repositioning of the actuator at the desired set-point is performed. Varying degrees of hysteresis can be incorporated into this control scheme to accommodate user requirements.

Further regarding FIG. 5, the power supply voltage is monitored such that its falling below a certain level is detected thereby indicating a power failure (STEP 109). In the current embodiment, the motor supply voltage is monitored for this purpose as it is conveniently also monitored for motor control purposes.

Figure 11:
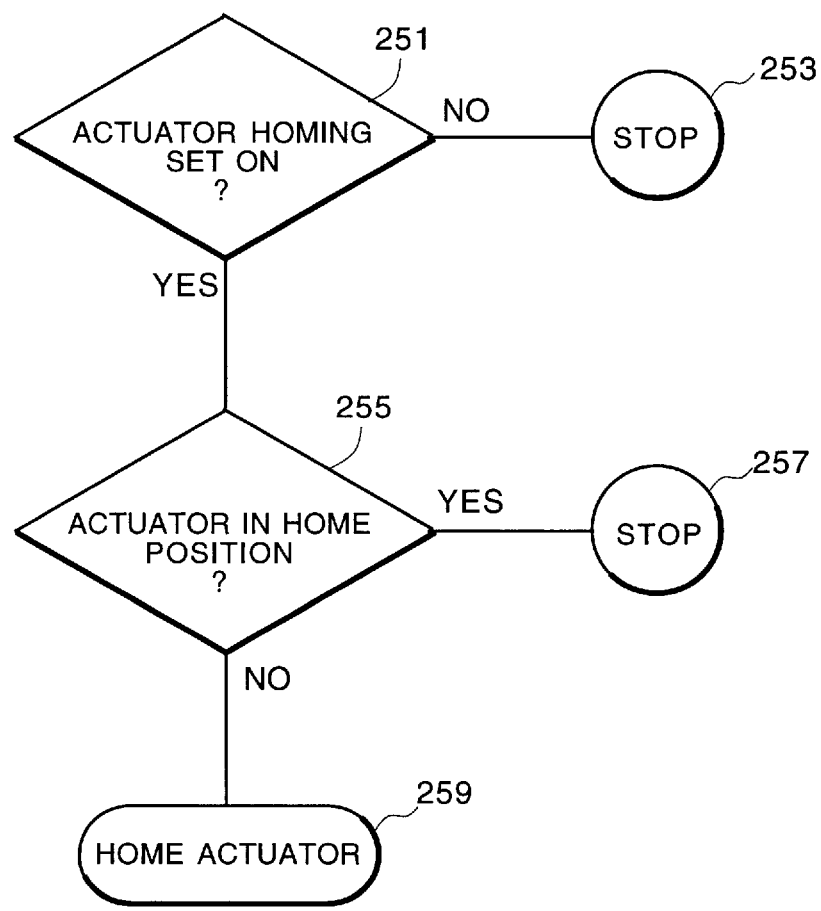
FIG. 11 is a flow-diagram of a technique for responding to a power loss condition according to one embodiment of the present invention.

Upon a power failure, absent any intervening techniques, the motor windings are deenergized and the motor is free to turn under the actuator load. This load can include any loads on the device mechanically coupled to the actuator and a load from the optional spring return mechanism in the actuator. The spring return is designed to return the actuator to a home position upon a power failure event. However, the natural cogging of the brushless DC motor used in combination with high gearing ratios may prevent the spring return from operating properly. The cogging of the motor may provide sufficient static friction in the actuator system to prevent the spring return mechanism from operating. Thus, according to the present invention, a technique for overcoming the static friction of the actuator system (including that resulting from motor cogging and other sources) upon power failure is depicted in FIG. 11.

To summarize, upon power failure, the remaining capacitively stored energy in the actuator power supply is used to begin actuator motion in the homing direction of the spring return. This overcomes the static friction of the system, and once power has completely dissipated, the dynamics of the spring return continue the actuator motion to the home position.

In particular, after power failure is detected, a check is performed to determine whether actuator homing upon power failure is desired (STEP 251). If homing is not desired, the routine stops (STEP 253). For example, if no spring return mechanism is used, actuator homing upon power failure will not be active.

If actuator homing upon power failure is desired, a test is next performed to detect if the actuator is already in its home position (STEP 255). If so, the routine does not continue (STEP 257). If the actuator is not in home position, a routine is called (e.g., FIG. 7) to move the actuator to its home position (STEP 259). As motion begins, the static friction of the motor cogging is overcome, and once power has completely dissipated, the dynamics of the spring return continue the actuator motion to the home position.

The present invention has several advantages and features associated with it. Torque control of a brushless DC motor is performed without the use of current sensing techniques. This facilitates the elimination of, for example, sensing resistors that consume energy, occupy space and dissipate heat. Also, actuator stopping and holding is performed in a manner that minimizes the amount of energy required. Further, problems associated with motor cogging and other static friction interfering with the spring return mechanism are mitigated. Thus, the techniques disclosed herein advance the art of actuator and motor control.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A method for use in controlling a brushless DC motor, said motor being energized by a plurality of drivers, said drivers supplying energy to said motor based upon a motor winding commutation pattern and a PWM control signal used therewith to control an amount of energy transferred to said motor and thereby controlling a speed of said motor, said method comprising:

determining a speed of the motor;

determining a line voltage supplying said drivers of said motor; and based upon said speed, said line voltage and predetermined motor performance data, determining a maximum PWM on-time for said PWM control signal, said maximum PWM on-time corresponding to a predetermined motor torque output limit.

2. The method of claim 1, wherein said motor includes at least one positional sensor, and wherein said determining said speed includes reading motor position information from said positional sensor.

3. The method of claim 2, wherein said positional information is accumulated to facilitate determining absolute motor position in the form of at least a number of motor rotations.

4. The method of claim 3, wherein said motor is included within an actuator and is coupled to an output member of said actuator through reduction gearing, said method including tracking a position of said output member of said actuator using said determined absolute motor position.

5. The method of claim 4, wherein said tracking comprises tracking one of a rotational position and a linear position of said output member.

6. The method of claim 4, wherein said method includes an initialization routine executed at least upon actuator initialization, said initialization routine including seeking an actuator travel limit by rotating said motor in a predetermined direction until said PWM control signal reaches said maximum on-time and said motor speed is below a predetermined minimum, thereby indicating said actuator output reaching a home position and mechanical limit.

7. The method of claim 1, wherein said predetermined motor performance data includes constant torque curves for combinations of line voltage, motor speed and PWM on-time.

8. The method of claim 1, wherein said motor is included within an actuator having an output member mechanically coupled to said motor, and wherein said method includes controlling rotation of said motor to selectively position said output member of said actuator.

9. The method of claim 8, wherein during said positioning of said actuator, said speed of said motor is regulated using said PWM control signal.

10. The method of claim 9, wherein said PWM control signal is limited to said maximum PWM on-time to limit motor torque output to said predetermined motor torque output.

11. A method for controlling an actuator that includes an output member that is mechanically driven by a brushless DC motor, said motor being energized by a plurality of drivers, said drivers supplying energy to said motor based upon a motor winding commutation pattern and a PWM control signal used therewith to control an amount of energy transferred to said motor and thereby controlling motor speed, said method comprising:

determining said motor speed;

determining a line voltage supplying said drivers of said motor;

based upon said motor speed, said line voltage and predetermined motor performance data, determining a maximum PWM on-time for said PWM control signal, said maximum PWM on-time corresponding to a predetermined motor torque output limit;

controlling said speed of said motor by regulation of said PWM control signal in response to said determined motor speed and a desired motor speed; and wherein said controlling includes limiting said PWM control signal to said maximum PWM on-time thereby limiting output of said motor to said predetermined motor torque output limit.

12. A method of operating an actuator including an output member and a brushless DC motor mechanically coupled thereto, said brushless DC motor being controlled at least in part by a PWM control signal operable to control an amount of energy transferred to said motor, said method comprising:

positioning said output member by operating said motor;

controlling output torque of said motor during said positioning thereof by collecting operational motor data, said operational motor data being exclusive of motor current consumption, and using said collected data in combination with predetermined motor performance data to regulate motor torque using said PWM control signal.

13. An apparatus comprising:

a brushless DC motor;

a plurality of drivers coupled to said motor for energization thereof, wherein said drivers supply energy to said motor based upon a motor winding commutation pattern and a PWM control signal used therewith to control an amount of energy transferred to said motor thereby controlling a speed thereof;

means for determining a speed of the motor;

means for determining a line voltage supplying said drivers of said motor; and means for determining a maximum PWM on-time for said PWM control signal based upon said speed, said line voltage and predetermined motor performance data, wherein said maximum PWM on-time corresponds to a predetermined motor torque output limit.

14. The apparatus of claim 13, wherein said motor includes at least one positional sensor, and wherein said means for determining said speed includes means for reading motor position information from said positional sensor.

15. The apparatus of claim 14, further including means for accumulating said positional information to facilitate determining absolute motor position in the form of at least a number of motor rotations.

16. The apparatus of claim 15, wherein said motor is included within an actuator and is coupled to an output member of said actuator through reduction gearing, said apparatus further including means for tracking a position of said output member of said actuator using said determined absolute motor position.

17. The apparatus of claim 16, wherein said means for tracking comprises means for tracking one of a rotational position and a linear position of said output member.

18. The apparatus of claim 17, means for seeking an actuator travel limit by rotating said motor in a predetermined direction until said PWM control signal reaches said maximum on-time and said motor speed is below a predetermined minimum, thereby indicating said actuator output reaching a home position and mechanical limit.

19. The apparatus of claim 13, wherein said predetermined motor performance data includes constant torque curves for combinations of line voltage, motor speed and PWM on-time.

20. The apparatus of claim 13, wherein said motor is included within an actuator having an output member mechanically coupled to said motor, and wherein said apparatus further includes means for controlling rotation of said motor to selectively position said output member of said actuator.

21. The apparatus of claim 20, wherein during said positioning of said actuator, said speed of said motor is regulated using said PWM control signal.

22. The apparatus of claim 21, including means for limiting said PWM control signal to said maximum PWM on-time to limit motor torque output to said predetermined motor torque output limit.

23. An apparatus for controlling an actuator that includes an output member that is mechanically driven by a brushless DC motor, said motor being energized by a plurality of drivers, said drivers supplying energy to said motor based upon a motor winding commutation pattern and a PWM control signal used therewith to control an amount of energy transferred to said motor and thereby controlling motor speed, said apparatus comprising:

means for determining said motor speed;

means for determining a line voltage supplying said drivers of said motor;

means for determining a maximum PWM on-time based upon said motor speed, said line voltage and predetermined motor performance data, wherein said maximum PWM on-time corresponds to a predetermined motor torque output limit;

means for controlling said motor speed by regulation of said PWM control signal in response to said determined motor speed and a desired motor speed; and wherein said means for controlling includes means for limiting said PWM control signal to said maximum PWM on-time thereby limiting output of said motor to said predetermined motor torque output limit.

24. An actuator comprising:

an output member;

a brushless DC motor mechanically coupled to said output member;

a PWM control signal controllable coupled, at least in part, to said brushless DC motor and being operable to control an amount of energy transferred to said motor;

means for positioning said output member by operating said motor;

means for controlling output torque of said motor during said positioning thereof, said means for controlling including means for collecting operational motor data, said operational motor data being exclusive of motor current consumption; and means for using said collected data in combination with predetermined motor performance data to regulate motor torque using said PWM control signal.

* * * * *